(12) United States Patent
Azom et al.

(10) Patent No.: US 11,927,084 B2
(45) Date of Patent: Mar. 12, 2024

(54) HYDROCARBON-PRODUCTION METHODS EMPLOYING MULTIPLE SOLVENT PROCESSES ACROSS A WELL PAD

(71) Applicant: Cenovus Energy Inc., Calgary (CA)

(72) Inventors: Prince Azom, Calgary (CA); Amos Ben-Zvi, Calgary (CA)

(73) Assignee: Cenovus Energy Inc., Calgary (CA)

( * ) Notice: Subject to any disclaimer, the term of this patent is extended or adjusted under 35 U.S.C. 154(b) by 0 days.

(21) Appl. No.: 17/518,947

(22) Filed: Nov. 4, 2021

(65) Prior Publication Data
US 2022/0136376 A1   May 5, 2022

Related U.S. Application Data

(60) Provisional application No. 63/109,744, filed on Nov. 4, 2020.

(51) Int. Cl.
*E21B 43/24* (2006.01)
*C09K 8/592* (2006.01)

(52) U.S. Cl.
CPC .......... *E21B 43/2406* (2013.01); *C09K 8/592* (2013.01)

(58) Field of Classification Search
CPC . C09K 8/592; E21B 43/2406; E21B 43/2408; E21B 43/24; E21B 43/16; E21B 41/0092; E21B 43/30; E21B 43/305
See application file for complete search history.

(56) References Cited

U.S. PATENT DOCUMENTS 5,318,124 A * 6/1994 Ong ...................... E21B 43/305
166/50
7,556,099 B2 * 7/2009 Arthur ................. E21B 43/2408
166/372
(Continued)

FOREIGN PATENT DOCUMENTS

CA         2698898 A1     7/2011
CA         2757125 A1     2/2013
(Continued)

OTHER PUBLICATIONS

Fuller, Mike. The Analysis of carbon dioxide in Natural Gas, 2013, AMETEK Process Instruments, retrieved Feb. 16, 2023 from https://cpinstruments.com/wp-content/uploads/2020/02/ametek-process-instruments-el-analisis-de-dioxido-de-carbono-en-gas-natural.pdf (Year: 2013).*

*Primary Examiner* — Angela M DiTrani Leff
(74) *Attorney, Agent, or Firm* — Gordon & Jacobson, P.C.

(57) ABSTRACT

Disclosed are methods for producing hydrocarbons from a subterranean reservoir. The methods comprise penetrating the subterranean reservoir with a plurality of well pairs that are laterally displaced across a well pad in an array. The methods further comprise operating the plurality of well pairs under a first set of conditions that induce a solvent-concentration gradient, a temperature gradient, or a combination thereof within the subterranean reservoir by: (i) injecting varying concentrations of steam, solvent, or combinations thereof across the array, and (ii) producing hydrocarbons from the reservoir via the plurality of well pairs. The methods further comprise operating the plurality of well pairs under a second set of conditions that delocalize the (Continued)

solvent-concentration gradient, the temperature gradient, or the combination thereof across the array to enhance hydrocarbon production.

14 Claims, 8 Drawing Sheets

(56) References Cited

U.S. PATENT DOCUMENTS

| | | | | |
|---|---|---|---|---|
| 8,770,289 B2* | 7/2014 | Boone | ............... | E21B 43/24 |
| | | | | 166/50 |
| 9,091,159 B2* | 7/2015 | Chhina | ............... | E21B 43/305 |
| 9,267,367 B2* | 2/2016 | Wheeler | ............... | E21B 43/168 |
| 10,145,226 B2* | 12/2018 | Yee | ............... | E21B 43/168 |
| 10,487,636 B2* | 11/2019 | Motahhari | ............... | E21B 43/168 |
| 2010/0004906 A1* | 1/2010 | Searles | ............... | E21B 43/20 |
| | | | | 703/2 |
| 2010/0276140 A1* | 11/2010 | Edmunds | ............... | E21B 43/2408 |
| | | | | 166/272.3 |
| 2013/0105147 A1* | 5/2013 | Scott | ............... | E21B 43/14 |
| | | | | 166/245 |
| 2014/0069641 A1* | 3/2014 | Kosik | ............... | C10G 1/04 |
| | | | | 166/267 |
| 2019/0017361 A1* | 1/2019 | Chen | ............... | E21B 43/164 |

FOREIGN PATENT DOCUMENTS

| | | | |
|---|---|---|---|
| CA | 2831928 A1 | 5/2014 |
| CA | 2886934 A1 | 9/2015 |

\* cited by examiner

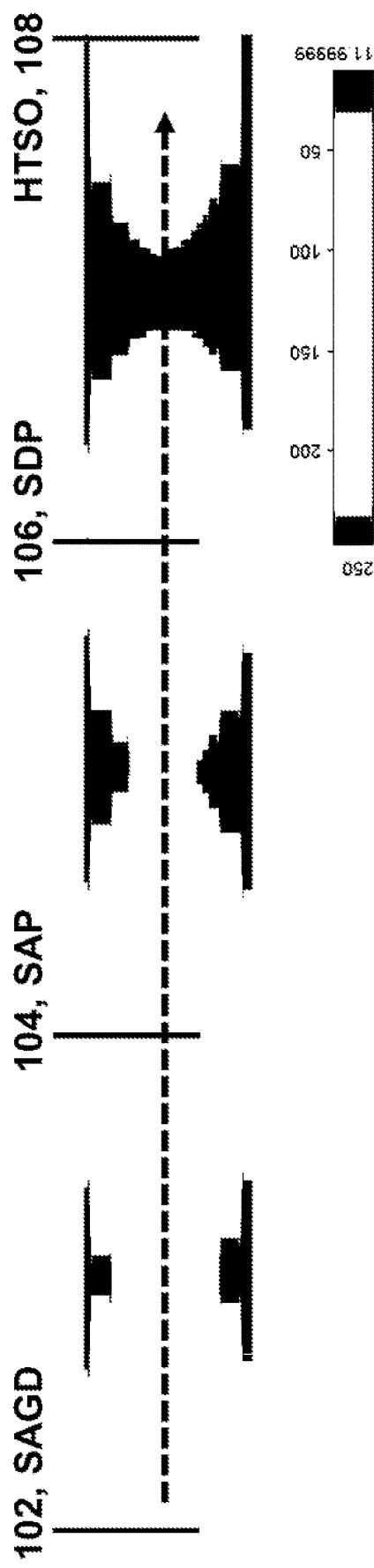
FIG. 3A
FIG. 3B

HYDROCARBON-PRODUCTION METHODS EMPLOYING MULTIPLE SOLVENT PROCESSES ACROSS A WELL PAD

CROSS-REFERENCE TO RELATED APPLICATIONS

This application claims priority to and benefit of U.S. Provisional Patent Application Ser. No. 63/109,744 filed on Nov. 4, 2020, the disclosure of which is incorporated herein by reference in its entirety.

TECHNICAL FIELD

The present disclosure generally relates to methods for in-situ hydrocarbon production that involve injecting solvent into a reservoir to mobilize viscous hydrocarbons. In particular, the present disclosure relates to hydrocarbon-production methods employing multiple solvent processes across a well pad.

BACKGROUND

Viscous hydrocarbons can be extracted from some subterranean reservoirs using in-situ production processes. Some in-situ production processes are thermal processes wherein heat energy is introduced to a reservoir to lower the viscosity of hydrocarbons in situ such that they can be recovered from a production well. In some thermal processes, heat energy is introduced by injecting a heated injection fluid into the reservoir by way of an injection well. Steam-assisted gravity drainage (SAGD) is a representative thermal-recovery process that uses steam to mobilize hydrocarbons in situ.

Some thermal recovery processes employ injection fluids that include solvent, optionally in combination with steam. These processes are referred to generally as "solvent processes" or "solvent technologies", and they are often further categorized based on the amount of solvent included in the injection fluid. Solvent-aided processes (SAP) are one such category. In the context of the present disclosure, SAP injection fluids comprise less than about 50% solvent and greater than about 50% steam on a mass basis. Solvent-driven processes (SDP) are another such category. In the context of the present disclosure, SDP injection fluids comprise greater than about 50% solvent and less than about 50% steam on a mass basis. Solvent only (SO) processes, as the name implies, employ injection fluids that are substantially free of steam and comprised exclusively (or almost exclusively) of solvent. In most SAP, SDP, and/or SO processes, the solvent component of the injection fluid is primarily in the gas phase as it passes from the injection well into the reservoir.

Solvent processes are typically employed as one phase in a broader production profile. For example, a well may be transitioned through: (i) a start-up phase during which hydraulic communication is established between the injection well and the production well; (ii) a SAGD phase during which a production chamber expands primarily in a vertical direction from the injection well and mobilized hydrocarbons are recovered from the production well along with condensed steam; (iii) an SAP, SDP, and/or SO phase during which injected solvent facilitates further chamber growth and hydrocarbon mobilization such that solvent and mobilized hydrocarbons are produced via the production well; and (iv) a blow-down phase during which non-condensable gas is injected to recover residual hydrocarbons and solvent that would otherwise remain stranded. In some cases, a well may be transitioned from a start-up phase to a SAP, SDP, and/or SO phase without an intervening SAGD phase.

To date, much of the research and development relating to solvent processes has been directed at determining how best to employ SAP, SDP, and/or SO technologies individually and/or how to best transition from one such technology to another over time (e.g. how and when to transition from SAP to SDP). In both cases, the approaches reported to date tend to consider operations at a single well or a single well pair and then extrapolate out to consider broader economic, production, and/or facility implications. However, many of the nuances associated with solvent processes are tied to inter-well dynamics that are not easily captured with single well and/or single well pair considerations. There is an unmet need for hydrocarbon production methods that take advantage of inter-well dynamics to capitalize on opportunities across the well pad as a whole.

SUMMARY

As individual technologies, SAGD, SAP, SDP, and SO processes each have strengths and weaknesses. The present disclosure posits that at least some of the weaknesses of any one such technology can be offset by the strengths of another provided the technologies are deployed and operated in strategic plurality across an array. Specifically, the results of the present disclosure evidence that improved production metrics can be achieved when a well pad comprising an array of well pairs is operated to induce localized solvent-concentration gradients and/or localized temperature gradients, and then to delocalize the gradient(s) across the array. As an archetypal example, operating an array of well pairs on a pad with: (i) peripheral well pairs using SAGD and/or SAP injection fluids, and (ii) medial well pairs using SDP and/or SO injection fluids, can induce steep temperature gradients in proximity to the peripheral well pairs and/or steep solvent-concentration gradients in proximity to the medial well pairs, and inter-well pressure differentials can be used to drive the delocalization of at least one such gradient in pursuit of improved cumulative steam-oil ratios (cSOR) and/or solvent-oil ratios ($cS_{olv}OR$) across the well pad as a whole. In this way, the previously localized and steep gradients are distributed across the array—the technologies "blend"—and the weakness(es) of one technology are offset by the strength(s) of another. In the present archetypal example, the solvent-lean peripheral well pairs benefit from an influx of solvent and/or the solvent-rich medial well pairs benefit from an influx of heat energy. The results of the present disclosure highlight the potential for the methods disclosed herein to provide improved recovery over both conventional approaches (e.g. SAGD only) and over more sophisticated comparators.

Select embodiments of the present disclosure relate to a method for producing hydrocarbons from a subterranean reservoir. The method comprises penetrating the subterranean reservoir with a plurality of well pairs that are laterally displaced across a well pad in an array. The method further comprises operating the plurality of well pairs under a first set of conditions that induce a solvent-concentration gradient, a temperature gradient, or a combination thereof within the subterranean reservoir by: (i) injecting varying concentrations of steam, solvent, or combinations thereof across the array, and (ii) producing hydrocarbons from the reservoir via the plurality of well pairs. The method further comprises operating the plurality of well pairs under a second set of conditions that delocalize the solvent-concentration gradient, the temperature gradient, or the combination thereof across the array to enhance hydrocarbon production.

Other aspects and features of the methods of the present disclosure will become apparent to those ordinarily skilled in the art upon review of the following description of specific embodiments.

BRIEF DESCRIPTION OF THE DRAWINGS

These and other features of the present disclosure will become more apparent in the following detailed description in which reference is made to the appended drawings. The appended drawings illustrate one or more embodiments of the present disclosure by way of example only and are not to be construed as limiting the scope of the present disclosure.

FIG. 3A and FIG. 3B show profile-view half-symmetry reservoir models of temperature distribution and solvent distribution after three years of operating a method in accordance with the present disclosure.

DETAILED DESCRIPTION

Figure 1:
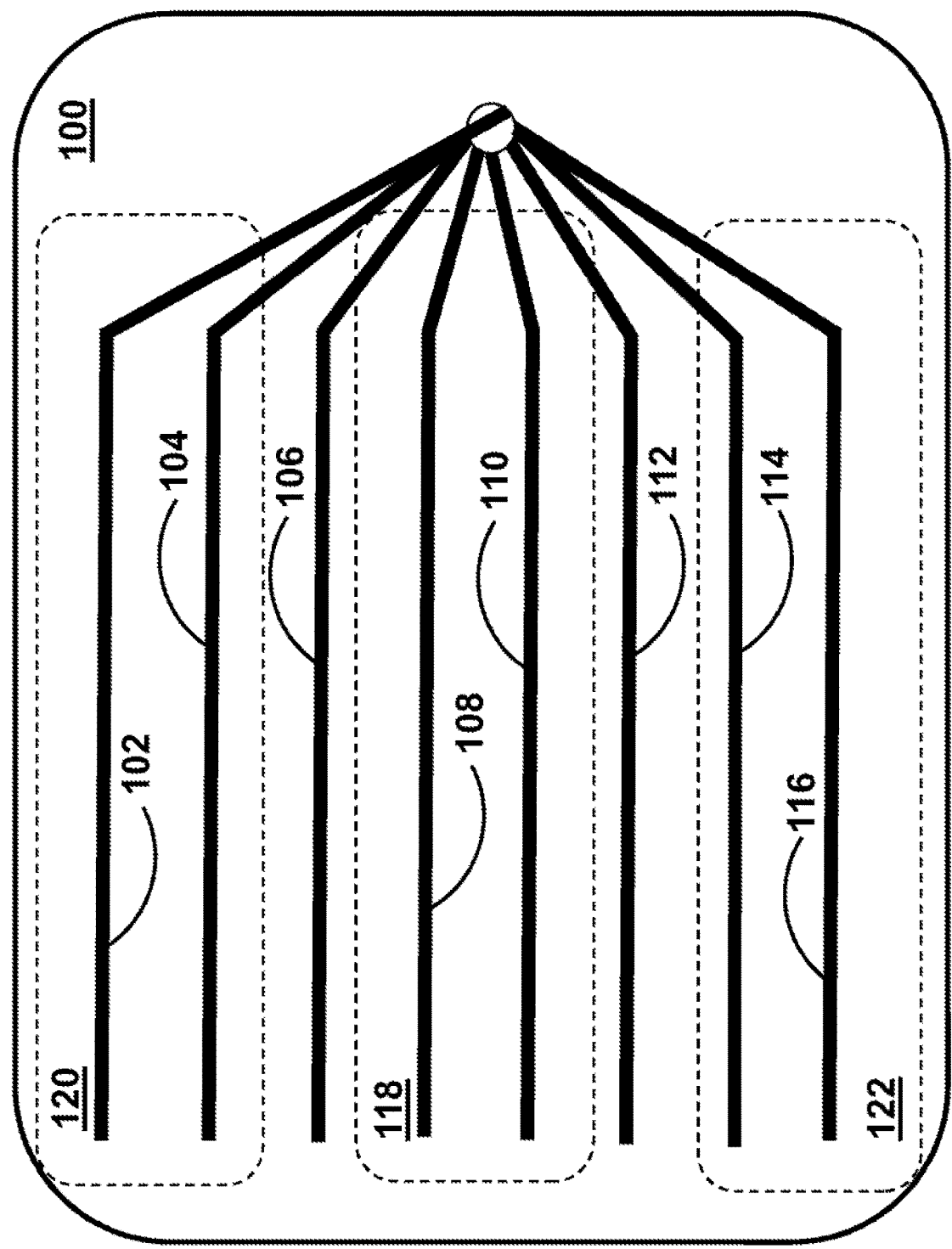
FIG. 1 shows a plan-view schematic of a well pad configured for executing a method in accordance with the present disclosure.

Embodiments of the present disclosure will now be described by reference to FIG. 1 to FIG. 8.

As noted above, steam assisted gravity drainage (SAGD), solvent-aided processes (SAP), solvent-driven processes (SDP), and solvent only (SO) processes are used for in-situ hydrocarbon recovery In the context of the present disclosure, SAP injection fluids comprise less than about 50% solvent and greater than about 50% steam on a mass basis, SDP injection fluids comprise greater than about 50% solvent and less than about 50% steam on a mass basis, and SO processes employ injection fluids that are substantially free of steam and comprised exclusively (or almost exclusively) of solvent. Those skilled in the art will appreciate that SAGD, SAP, SDP, and SO processes can each be implemented in a variety of ways, such that these each of these categories comprise a plurality of more specific embodiments. For example, high-temperature solvent only (HTSO), low-temperature solvent only (LTSO), and vapour extraction (VAPEX) are non-limiting examples of SO processes.

A high-level summary of the strengths and weaknesses of SAGD, SAP, SDP, and SO processes is set out in Table 1 with respect to, for example, technology maturity, greenhouse gas (GHG) emission intensity, solvent consumption/recycling requirements, etc.

TABLE 1

Strengths and Weaknesses for various technologies employed during in-situ hydrocarbon recovery.

| Technology | Strengths | Weaknesses |
|---|---|---|
| SAGD | Highest heat energy available to reduce bitumen viscosity<br>Most mature technology<br>Zero solvent-recycling costs | Highest energy intensity<br>Highest GHG emissions intensity<br>Excessive steam use<br>Highest water-treatment costs |
| SAP | Substantial heat energy available to reduce bitumen viscosity<br>Minimal solvent requirement modest solvent-recycling costs | Substantial energy intensity<br>Substantial GHG emissions intensity<br>Excessive steam use<br>Substantial risk of solvent-containment<br>Substantial water-treatment costs |
| SDP | Efficient use of steam/heat energy<br>Modest energy intensity<br>Modest GHG emissions intensity<br>Modest water-treatment costs | Substantial risk of insufficient heat injection<br>Substantial solvent requirement<br>Substantial solvent-recycling costs<br>Substantial risk of solvent-containment |
| SO | Sufficient heat energy<br>Zero steam requirement<br>Lowest energy intensity<br>Lowest GHG emissions intensity<br>Lowest water-treatment costs | Highest risk of insufficient heat injection<br>Highest solvent requirement<br>Highest solvent recycling costs<br>Highest risk of solvent containment<br>Least mature technology |

The information in Table 1 highlights a useful phenomenon—at a high level, there is balanced duality across the spectrum of strengths and weaknesses when the various technologies are considered in terms of the relative amount of solvent included in the injection fluid. Where one technology is weak, its counterpart is strong, and vice versa. Recognizing that the strengths of one technology have the potential to offset the weaknesses of another, the present disclosure asserts that deploying multiple technologies across an array such that they complement each other can lead to improved production for the array as a whole. The methods of the present disclosure harness this potential by arranging and operating complementary technologies in strategic plurality across a well pad—first to induce local solvent-concentration gradients and/or temperature gradients and then to delocalize the gradients across the array.

Select embodiments of the present disclosure relate to a method for producing hydrocarbons from a subterranean reservoir, the method comprising: penetrating the subterranean reservoir with a plurality of well pairs that are laterally displaced across a well pad in an array; operating the plurality of well pairs under a first set of conditions that induce a solvent-concentration gradient, a temperature gradient, or a combination thereof within the subterranean reservoir by: (i) injecting varying concentrations of steam, solvent, or combinations thereof across the array, and (ii) producing hydrocarbons from the reservoir via the plurality of well pairs; and operating the plurality of well pairs under a second set of conditions that delocalize the solvent-concentration gradient, the temperature gradient, or the combination thereof across the array to enhance hydrocarbon production.

To illustrate the strategies underlying the methods of the present disclosure, consider a hydrocarbon production process that is operated on a well pad as shown schematically in FIG. 1. In FIG. 1, a well pad 100 comprises a set of eight well pairs as indicated with reference numbers 102, 104, 106, 108, 110, 112, 114, and 116. The well pairs 102, 104, 106, 108, 110, 112, 114, and 116 comprise substantially horizontal sections that are laterally displaced from—and substantially parallel to—one another such that they create an array. Following the orientation of the array, the well pad 100 can be characterized as comprising a medial section 118 that is flanked by a pair of peripheral sections 120 and 122. In this respect, the terms "medial" and "peripheral" do not imply any particular area or shape. Instead, they merely denote a relative condition of being closer/further from the edge (or centre) of the well pad such that, for example, well pair 102 is peripheral to well pair 108.

In a method in accordance with the present disclosure, the well pad 100 is operated as follows: (i) the well pairs 102 and 116 are operated under SAGD conditions, (ii) the well pairs 104 and 114 are operated under SAP conditions, (iii) the well pairs 106 and 112 are operated under SDP conditions; and (iv) the well pairs 108 and 110 are operated under SO conditions. Operating in this manner induces steep localized temperature gradients in the peripheral sections 120 and 122, which are solvent lean relative to the medial section 118. Likewise, operating in this manner provides steep localized solvent-concentration gradients in the medial section 118, and the medial section 118 is solvent rich relative to the peripheral sections 120 and 122. Over time, further operating the well pairs 102, 104, 106, 108, 110, 112, 114, and/or 116 increases thermal and hydraulic communication therebetween, and this affords increasing opportunity to delocalize the solvent-concentration gradients and/or the temperature gradients across the array. The results of the present disclosure evidence that doing so can provide improved production metrics when considered across the well pad as a whole.

Delocalizing solvent-concentration gradients and/or temperature gradients across the array can be achieved by a variety of methods. In select embodiments of the present disclosure, inter-well pressure differentials may be employed to this end. For example, with further reference to FIG. 1, the bottom-hole pressures (BHP) of the well pairs 102 and 116 relative to the well pairs 108 and 110, respectively, may be modulated to provide a pressure-based driving force that delocalizes solvent away from the medial section 118 and towards the peripheral sections 120 and 122, such that the solvent-lean well pairs benefit from an increase in solvent concentration. In other words, methods of the present disclosure enable in-situ solvent recycling, wherein injected solvent is used to increase production at a first well pair and then delocalized across a plurality of well pairs without requiring it to be produced to the surface, treated, and re-injected. Likewise, the BHP of the well pairs 102 and 116 relative to the well pairs 108 and 110, respectively, may be modulated to a pressure-based driving force that delocalizes heat energy away from the peripheral sections 120 and 122 and towards the medial section 118, such that the solvent-rich well pairs benefit from an increase in temperature.

Importantly, inter-well-pair pressure differentials are not required to execute the methods of the present disclosure. For example, as set out in the Examples below with further reference to FIG. 1, the well pairs 102, 104, 106, 108, 110, 112, 114, and/or 116 may be operated at substantially the same pressure, and the solvent-concentration gradients and/or temperature gradients can still be delocalized to provide improved recovery.

The well-pair arrays of the present disclosure can be characterized by an abbreviated nomenclature where the various technologies are listed in acronym form and separated by "/" punctuation marks to indicate a transition to an adjacent well pair. For example, the well-pair array shown schematically in FIG. 1 can be characterized as SAGD/SAP/SDP/SO/SO/SDP/SAP/SAGD. The same nomenclature can be applied to describe an array that is one of a multi-array well pad. For example, well pairs 102, 104, and 106 in FIG. 1 can be characterized as a SAGD/SAP/SDP array within the well pad 100.

In select embodiments of the present disclosure, the array comprises a SAGD/SAP/SDP/SO well-pair configuration. In select embodiments of the present disclosure, the array comprises a SAGD/SAP/SDP well-pair configuration. In select embodiments of the present disclosure, the array comprises a SAP/SDP/SO well-pair configuration. In select embodiments of the present disclosure, the array comprises a SAGD/SDP/SO well-pair configuration. In select embodiments of the present disclosure, the array comprises a SAGD/SAP/SO well-pair configuration. In select embodiments of the present disclosure, the array comprises a SAGD/SAP well-pair configuration. In select embodiments of the present disclosure, the array comprises a SAGD/SDP well-pair configuration. In select embodiments of the present disclosure, the array comprises a SAGD/SO well-pair configuration. In select embodiments of the present disclosure, the array comprises a SAP/SDP well-pair configuration. In select embodiments of the present disclosure, the array comprises a SAP/SO well-pair configuration. In select embodiments of the present disclosure, the array comprises an SDP/SO well-pair configuration. Those skilled in the art, who have benefited from the teachings of the present disclosure, will understand how to select an appropriate array for operating the methods of the present disclosure having regard to, for example, the particular reservoir geology, well configurations, solvent selection, temperature profiles, pressure profiles, and/or production objectives.

In select embodiments of the present disclosure, the array is substantially bilaterally symmetrical. The SAGD/SAP/SDP/SO/SO/SDP/SAP/SAGD array of FIG. 1 is an example of a bilaterally symmetric array. Bilaterally symmetric arrays may comprise as few as three well pairs, such as a SAGD/SDP/SAGD array.

In select embodiments of the present disclosure, the array is a two-well-pair array, a three-well-pair array, a four-well-pair array, a five-well-pair array, a six-well-pair array, a seven-well-pair array, an eight-well-pair array, a nine-well-pair array, a ten-well-pair array, an eleven-well-pair array, a twelve-well-pair array, a thirteen-well-pair array, a fourteen-well-pair array, a fifteen-well-pair array, a sixteen-well-pair array, a seventeen-well-pair array, an eighteen-well-pair array, a nineteen-well-pair array, or a twenty-well-pair array.

In select embodiments of the present disclosure, the well pad further comprises a second plurality of well pairs that are not part of the array. Accordingly, delocalizing a solvent-concentration gradient and/or temperature gradient across an array does not necessarily imply delocalization across an entire well pad. Moreover, delocalizing a solvent-concentration gradient and/or temperature gradient across an array does not imply delocalization across every well pair of the array. In select embodiments of the present disclosure, the second set of conditions delocalize the solvent-concentration gradient, the temperature gradient, or the combination thereof across: (i) about 20% of the array, (ii) about 30% of the array, (iii) about 40% of the array, (iv) about 50% of the array, (v) about 60% of the array, (vi) about 70% of the array, (vii) about 80% of the array, (viii) about 90% of the array, or (ix) about 100% of the array. Those skilled in the art, who have benefited from the teachings of the present disclosure, will understand how to select an appropriate delocalization target for operating the methods of the present disclosure having regard to, for example, the particular reservoir geology, well configurations, solvent selection, temperature profiles, pressure profiles, and/or production objectives.

In select embodiments of the present disclosure, the second set of conditions provide bottom-hole pressure (BHP) values that differ between adjacent well pairs within the array by: (i) between about 0 kPa and about 500 kPa, (ii) between about 50 kPa and about 350 kPa, or (iii) between about 100 kPa and about 300 kPa. Those skilled in the art who have benefited from the teachings of the present disclosure will appreciate that the selection of an appropriate inter-well pressure differential may involve considerations with respect to well spacing, vertical and/or horizontal permeability, porosity, temperature gradients, solvent parameters, and the like.

In select embodiments of the present disclosure, the second set of conditions provide bottom-hole pressure (BHP) values that are substantially the same between adjacent well pairs within the array.

In select embodiments of the present disclosure, the second set of conditions provide BHP values that are substantially consistent along the well pairs. In select embodiments of the present disclosure, the second set of conditions provide BHP values that are distributed substantially asymmetrically along the well pairs. For example, in select embodiments of the present disclosure, BHP values may by distributed asymmetrically along a well pair to modulate chamber conformance. Those skilled in the art who have benefited from the teachings of the present disclosure will appreciate that, for example, flow control devices may be employed to prioritize chamber development in proximity to one or more sections of the injection well by preferentially distributing injection fluids towards the toe and/or heel of the injection well.

The second set of conditions delocalize the solvent-concentration gradient, the temperature gradient, or the combination thereof over a period of: (i) between about 1 month and about 36 months, (ii) between about 6 months and about 30 months, or (iii) between about 12 months and about 24 months. Those skilled in the art who have benefitted from the teachings of the present disclosure will appreciate that the time required to delocalize the solvent-concentration gradient, the temperature gradient, or the combination thereof may involve considerations with respect to well spacing, inter-well pressure differentials, vertical and/or horizontal permeability, porosity, temperature gradients, solvent parameters, and the like.

In select embodiments of the present disclosure, the injecting of varying concentrations of steam, solvent, or combinations thereof across the array comprises injecting a first injection fluid into a first well pair within the array and injecting a second injection fluid into a second injection well pair within the array, and wherein the first injection fluid has a solvent concentration that is at least about 10 wt % higher than that of the second injection fluid. In select embodiments of the present disclosure, the first injection fluid has the solvent concentration of the first injection fluid is: (i) at least about 20 wt % higher, (ii) at least about 30 wt. % higher, (iii) at least about 40 wt. % higher, (iv) at least about 50 wt. % higher, (v) at least about 60 wt. % higher, (vi) at least about 70 wt. % higher, or (vii) at least about 80 wt. % higher, than that of the second injection fluid. Accordingly, in the context of the present disclosure, categories such as SAGD, SAP, SDP, SO, are categories of convenience that are not limiting on the scope of the present disclosure. Likewise, using an alternative method to categorize a particular technology does not influence the extent to which it falls within the scope of the present disclosure. Those skilled in the art will appreciate that, regardless of their categorization, solvent technologies can be characterized with respect to their concentration in an injection fluid, for example by wt. %, wt. ratio, vol. %, vol. ratio, mol. %, and/or mol. ratio. Those skilled in the art will readily understand how to convert from one such characterization to another having regard to the particular parameters associated with the operation.

In select embodiments of the present disclosure, the first well pair and the second well pair are adjacent well pairs.

In select embodiments of the present disclosure, the injecting varying concentrations of steam, solvent, or combinations thereof comprises injecting increasing concentrations of solvent in a substantially linear fashion across at least a portion of the array. For example, with reference to FIG. 1, well pairs 102, 104, 106, and 108 may be operated with injection fluids comprising 0 wt. %, 33 wt. %, 67 wt. %, and 100 wt. % solvent, respectively.

In select embodiments of the present disclosure, the injecting varying concentrations of steam, solvent, or combinations thereof comprises injecting increasing concentrations of solvent in a substantially non-linear fashion across at least a portion of the array For example, with reference to FIG. 1, well pairs 102, 104, 106, and 108 may be operated with injection fluids comprising 0 wt. %, 5 wt. %, 67 wt. %, and 100 wt. % solvent, respectively. In this case, the highest concentration gradient is likely to occur between well pairs 104 and 106. As a second example, with reference to FIG. 1, well pairs 102, 104, 106, and 108 may be operated with injection fluids comprising 0 wt. %, 40 wt. %, 50 wt. %, and 100 wt. % solvent, respectively. In this case, the highest concentration gradient is likely to occur between well pairs 106 and 108.

In select embodiments of the present disclosure, the plurality of well pairs within the array have an average well spacing of: (i) between about 20 meters and about 200 meters, (ii) between about 20 meters and about 150 meters, or (iii) between about 50 meters and about 100 meters. In select embodiments of the present disclosure, the plurality of well pairs are laterally displaced across the well pad such that the array comprises substantially consistent well spacing. In select embodiments of the present disclosure, the plurality of well pairs are laterally displaced across the well pad such that the array comprises variable well spacing.

In select embodiments of the present disclosure, the first conditions and the second conditions are the substantially same.

In select embodiments of the present disclosure, the first conditions and the second conditions are different, and wherein the first conditions are transitioned to the second conditions in response to a time-based trigger, a production-based trigger, an economic trigger, or a combination thereof.

In select embodiments of the present disclosure, the solvent comprises propane, butane, diluent, natural gas condensate, or a combination thereof.

In select embodiments of the present disclosure, the subterranean reservoir comprises a thin pay zone, and wherein the temperature gradient is delocalized into the thin pay zone. In select embodiments of the present disclosure, the subterranean reservoir comprises a heterogeneous pay zone, and wherein the temperature gradient is delocalized into the heterogeneous pay zone.

In select embodiments of the present disclosure, the subterranean reservoir comprises a thin pay zone, and wherein the solvent-concentration gradient is delocalized into the thin pay zone. In select embodiments of the present disclosure, the subterranean reservoir comprises a heterogeneous pay zone, and wherein the solvent-concentration gradient is delocalized into the heterogeneous pay zone.

In select embodiments of the present disclosure, one or more of the plurality of well pairs is single well.

Figure 2:
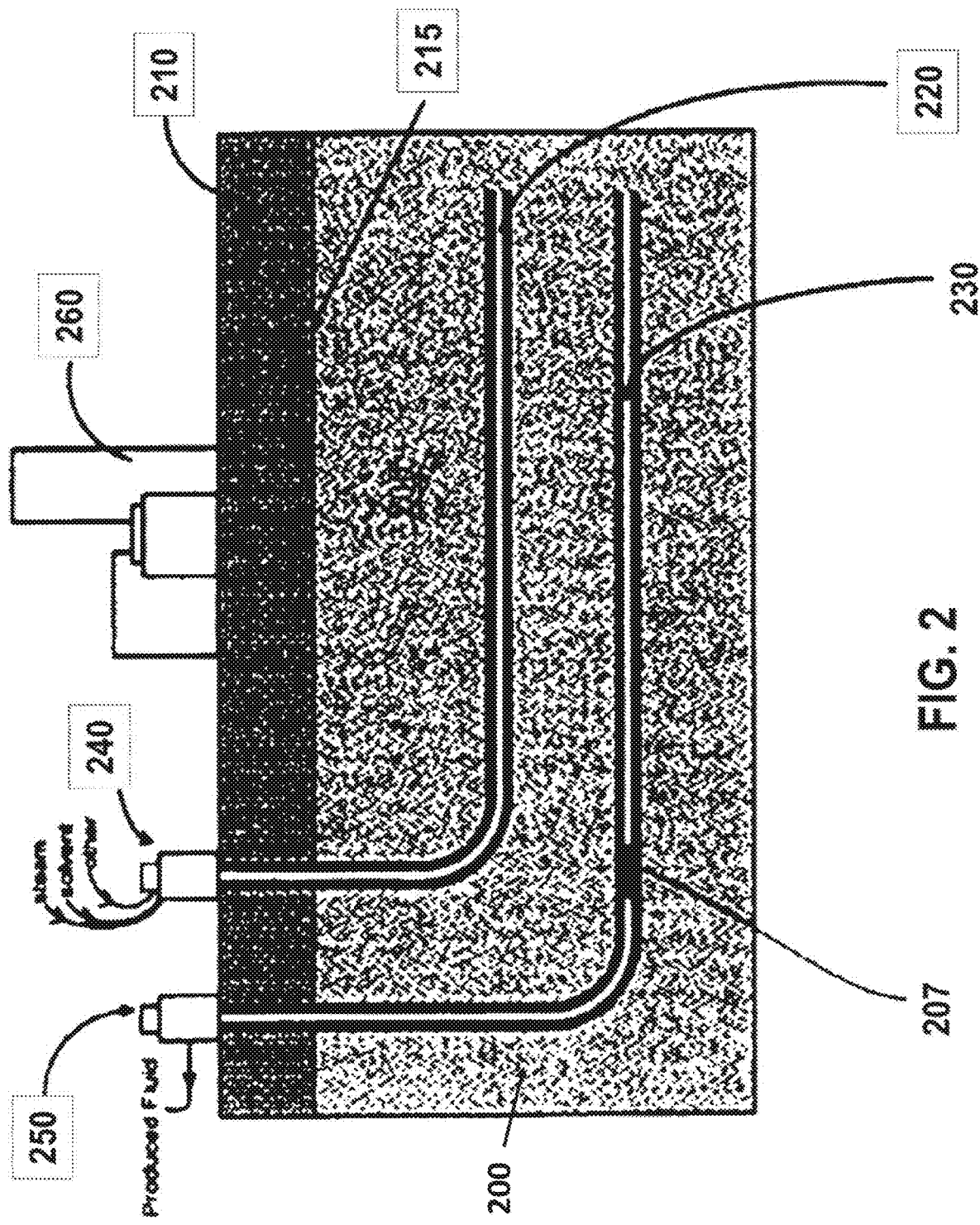
FIG. 2 shows a schematic illustration of a typical well pair configuration in a hydrocarbon reservoir, which are operable to implement an embodiment of the present disclosure.

FIG. 2 shows a schematic illustration of a typical well pair configuration in a hydrocarbon reservoir, which may be used in conjunction with other well pairs to implement an embodiment of the present disclosure. The well pair may be configured and arranged similar to a typical well pair configuration for SAGD operations.

In FIG. 2, the reservoir is indicated by reference number 200, and the reservoir contains heavy hydrocarbons below an overburden 210. Under natural conditions before any treatment, reservoir 200 is at a relatively low temperature, such as about 12° C., and the reservoir pressure may be from about 0.1 MPa to about 4 MPa, depending on the location and other characteristics of the reservoir.

The well pair includes an injection well 220 and a production well 230, which have horizontal sections extending substantially horizontally in reservoir 200, and which are drilled and completed for injecting injection fluids and producing hydrocarbons from reservoir 200. As depicted in FIG. 2, the well pair is typically positioned away from the overburden 210 and near the bottom of the pay zone or geological stratum in reservoir 200, as can be appreciated by those skilled in the art.

As is typical, injection well 220 may be vertically spaced from production well 230, such as at a distance of about 3 m to about 8 m, e.g., 5 m. The distance between the injection well and the production well may vary and may be selected to optimize the operation performance within technical and economical constraints, as can be understood by those skilled in the art. In select embodiments of the present disclosure, the horizontal sections of wells 220 and 230 may have a length of about 800 m. In other embodiments, the length may be varied as can be understood and selected by those skilled in the art. Wells 220 and 230 may be configured and completed according to any suitable techniques for configuring and completing horizontal in situ wells known to those skilled in the art. Injection well 220 and production well 230 may also be referred to as the "injection well" and "production well", respectively.

The overburden 210 may be a cap layer or cap rock. Overburden 210 may be formed of a layer of impermeable material such as clay or shale. A region in the reservoir 200 just below and near overburden 210 may be considered as an interface region 215.

As illustrated, wells 220 and 230 are connected to respective corresponding surface facilities, which typically include an injection surface facility 240 and a production surface facility 250. Surface facility 240 is configured and operated to supply injection fluids, such as steam and solvent, into injection well 220. Surface facility 250 is configured and operated to produce fluids collected in production well 230 to the surface. Each of surface facilities 240, 250 includes one or more fluid pipes or tubing for fluid communication with the respective well 220 or 230. As depicted for illustration, surface facility 240 may have a supply line connected to a steam generation plant for supplying steam for injection, and a supply connected to a solvent source for supplying the solvent for injection. Optionally, one or more additional supply lines may be provided for supplying other fluids, additives or the like for co-injection with steam or the solvent. Each supply line may be connected to an appropriate source of supply (not shown), which may include, for example, a steam generation plant, a boiler, a fluid mixing plant, a fluid treatment plant, a truck, a fluid tank, or the like. In select embodiments of the present disclosure, co-injected fluids or materials may be pre-mixed before injection. In other embodiments, co-injected fluids may be separately supplied into injection well 220. In particular, surface facility 240 is used to supply steam and a selected solvent into injection well 220. The solvent may be pre-mixed with steam at surface before co-injection. Alternatively, the solvent and steam may be separately fed into injection well 220 for injection into formation 200. Optionally, surface facility 240 may include a heating facility (not separately shown) for pre-heating the solvent before injection.

As illustrated, surface facility 250 includes a fluid transport pipeline for conveying produced fluids to a downstream facility (not shown) for processing or treatment. Surface facility 250 includes necessary and optional equipment for producing fluids from production well 230, as can be understood by those skilled in the art. An embodiment of surface facility 250 includes one or more valves for regulating the fluid flow in the liquid line of the produced fluid. The valve(s) may be a choke valve, such as an inline globe valve. The valve may be selected and configured to control the "backpressure" and the flow rate in the liquid line (also referred to as the emulsion line in the art).

Other necessary or optional surface facilities 260 may also be provided, as can be understood by those skilled in the art. For example, surface facilities 260 may include one or more of a pre-injection treatment facility for treating a material to be injected into the formation, a post-production treatment facility for treating a produced material, a control or data processing system for controlling the production operation or for processing collected operational data. Surface facilities 240, 250 and 260 may also include recycling facilities for separating, treating, and heating various fluid components from a recovered or produced reservoir fluid. For example, the recycling facilities may include facilities for recycling water and solvents from produced reservoir fluids.

Injection well 220 and production well 230 may be configured and completed in any suitable manner as can be understood or is known to those skilled in the art, so long as the wells are compatible with injection and recovery of heavy hydrocarbons. For example, in different embodiments, the well completions may include perforations, slotted liner, screens, and/or outflow control devices such as in injection well 220. For simplicity, other necessary or optional components, tools or equipment that are installed in the wells are not shown in the drawings as they are not particularly relevant to the present disclosure.

The methods of the present disclosure may be executed as part of a broader production lifecycle comprising a start-up phase, a ramp-up phase, a production phase, and a wind-down/blowdown phase. In an exemplary start-up phase, fluid communication between wells 220 and 230 is established in a manner that may be similar to the initial start-up phase in a conventional SAGD process. To permit drainage of mobilized hydrocarbons and condensate to production well 230, fluid communication between wells 220, 230 must be established. Fluid communication refers to fluid flow between the injection and production wells. Establishment of such fluid communication typically involves mobilizing viscous hydrocarbons in the reservoir to form a drainage fluid and removing the drainage fluid to create a porous pathway between the wells. In the context of the present disclosure, a drainage fluid may comprise a liquid phase and a gas phase, and the liquid phase may comprise mobilized hydrocarbons. To form a drainage fluid, viscous hydrocarbons may be mobilized by heating such as by injecting or circulating pressurized steam or hot water through injection well 220 or production well 230. In some cases, steam may be injected into, or circulated in, both injection well 220 and production well 230 for faster start-up. A pressure differential may be applied between injection well 220 and production well 230 to promote steam/hot water penetration into the porous reservoir area that lies between the wells of the well pair. The pressure differential may promote fluid flow and convective heat transfer to facilitate communication between the wells.

As is typical, the injection and production wells 220, 230 have terminal sections that are substantially horizontal and substantially parallel to one another. A person of skill in the art will appreciate that while there may be some variation in the vertical or lateral trajectory of the injection or production wells, causing increased or decreased separation between the wells, such wells for the purpose of this application will still be considered substantially horizontal and substantially parallel to one another. Spacing, both vertical and lateral, between injection wells and production wells may be optimized for establishing start-up or based on reservoir conditions.

Additionally or alternatively, other techniques may be employed during the start-up phase. For example, to facilitate fluid communication, a solvent may be injected into the reservoir region around and between the injection and production wells 220, 230. The region may be soaked with a solvent before or after steam injection. An example of start-up using solvent injection is disclosed in CA 2,698,898. In further examples, the start-up phase may include one or more start-up processes or techniques disclosed in CA 2,886,934, CA 2,757,125, or CA 2,831,928.

Once fluid communication between injection well 220 and production well 230 has been achieved, oil production or recovery may commence. As the oil production rate is typically low initially and will increase as the production chamber develops, the early production phase is known as the "ramp-up" phase. During the ramp-up phase, steam, with or without a solvent, is typically injected continuously into injection well 220, at constant or varying injection pressure and temperature. At the same time, drainage fluids comprising mobilized heavy hydrocarbons and aqueous condensate are continuously removed from production well 230. During ramp-up, the zone of communication between injection well 220 and production well 230 may continue to expand axially along the full length of the horizontal portions of wells 220, 230.

As the injected fluid heats up reservoir 200, heavy hydrocarbons in the heated region are softened, resulting in reduced viscosity. Further, as heat is transferred from steam to reservoir 200, steam and solvent vapour condense. The aqueous and solvent condensate and mobilized hydrocarbons will drain downward due to gravity. As a result of depletion of the heavy hydrocarbons, a porous region is formed in reservoir 200, which is referred to herein as a "production chamber". When a production chamber is filled with mainly steam, it is commonly referred to in the art as a "steam chamber." As the drainage fluids drain towards production well 230, they are taken up into production well 230 via one or more of the plurality of flow-inlet components. As discussed in detail below, individual flow-inlet components may be configured to choke-off gas ingress, such that the plurality flow-inlet components—taken together—serve to prioritize emulsion flow into the production well 230. As such, the drainage fluids collecting in proximity to the production well 230 are likely to be characterized by higher gas:liquid ratios than the production fluids inside the production well 230. In the context of the present disclosure, production fluids are those which are transferred to the surface, such as by gas lifting or through pumping with a pump 207 as is known to those skilled in the art.

At the point of injection into the reservoir 200, or in the injection well 220, the injected fluid/mixture may be at a temperature that is selected to optimize the production performance and efficiency. For example, for a given solvent to be injected the injection temperature may be selected based on the boiling point (or saturation) temperature of the solvent at the expected operating pressure in the reservoir. For propane, the boiling temperature is about 2° C. at about 0.5 MPa, and about 77° C. at about 3 MPa. For a different solvent, the injection temperature may be higher if the boiling point temperature of that solvent at the reservoir pressure is higher. In different embodiments and applications, the injection temperature may be substantially higher than the boiling point temperature of the solvent by, e.g., about 5° C. to about 200° C., depending on various operation and performance considerations. In some embodiments, the injection temperature may be from about 50° C. to about 320° C., and at a pressure from about 0.5 MPa to about 12.5 MPa, such as from about 0.6 MPa to about 5.1 MPa or up to about 10 MPa. At an injection pressure of about 3 MPa, the injection temperature for propane may be from about 80° C. to about 250° C., and the injection temperature for butane may be from about 100° C. to about 300° C. The injection temperature and pressure are referred to as injection conditions. Those skilled in the art will appreciate that the injection conditions may vary in different embodiments depending on, for example, the type of hydrocarbon recovery process implemented or the mobilizing agents selected, as well as various factors and considerations for balancing and optimizing production performance and efficiency. The injection temperature should not be too high as a higher injection temperature will typically require more heating energy to heat the injected fluid. Further, the injection temperature should be limited to avoid coking hydrocarbons in the reservoir formation. In some oil sands reservoirs, the coking temperature of the bitumen in the reservoir is about 350° C.

Once injected steam and/or vapour enter the reservoir, their temperature may drop under the reservoir conditions. The temperatures at different locations in the reservoir will vary as typically regions further away from injection well 220, or at the edges of the production chamber, are colder. During operations, the reservoir conditions may also vary. For example, the reservoir temperatures can vary from about 10° C. to about 275° C., and the reservoir pressures can vary from about 0.6 MPa to about 7 MPa depending on the stage of operation. The reservoir conditions may also vary in different embodiments. As noted above, injected steam and solvent condense in the reservoir mostly at regions where the reservoir temperature is lower than the dew point temperature of the solvent at the reservoir pressure. Condensed steam (water) and/or solvent can mix with the mobilized bitumen to form drainage fluids. It is expected that in a typical reservoir subjected to steam/solvent injection, the drainage fluids include a stream of condensed steam (or water, referred to as the water stream herein). The water stream may flow at a faster rate (referred to as the water flow rate herein) than a stream of mobilized bitumen containing oil (referred to as the oil stream herein), which may flow at a slower rate (referred to as the oil flow rate herein). The drainage fluids can be drained to the production well by gravity. The mobilized bitumen may still be substantially more viscous than water, and may drain at a relatively low rate if only steam is injected into the reservoir. However, condensed solvent may dilute the mobilized bitumen and increase the flow rate of the oil stream.

Thus, injected steam and vapour of the solvent both assist to mobilize the viscous hydrocarbons in the reservoir 200. A drainage fluid formed in the production chamber may include oil, condensed steam (water), and a condensed phase of the solvent. The reservoir fluid is drained by gravity along the edge of production chamber into production well 230 for recovery of oil.

In various embodiments, the solvent may be selected so that dispersion of the solvent in the production chamber, as well as in the drainage fluid increases the amount of oil contained in the fluid and increases the flow rate of oil stream from the production chamber to the production well 230. When solvent condenses (forming a liquid phase) in the production chamber, it can be dispersed in the drainage fluid to increase the rate of drainage of the oil stream from the reservoir 200 into the production well 230.

After the produced fluids are surfaced, the solvent and water may be separated from oil in the produced fluids by a method known in the art depending on the particular solvent(s) involved. The separated water and solvent can be further processed by known methods, and recycled to the injection well 220. In some embodiments, the solvent is also separated from the produced water before further treatment, re-injection into the reservoir, or disposal.

As mentioned above, the production chamber forms and expands due to depletion of hydrocarbons and other in situ materials from regions of reservoir 200 above the injection well 220. Injected steam/solvent vapour tend to rise up to reach the top of production chamber before they condense, and steam/solvent vapour can also spread laterally as they travel upward. During early stages of chamber development, the production chamber expands upwardly and laterally from injection well 220. During the ramp-up phase and the early production phase, the production chamber can grow vertically towards overburden 210. At later phases, after the production chamber has reached the overburden 210, the production chamber may expand mainly laterally. Depending on the size of reservoir 200 and the pay therein and the distance between injection well 220 and overburden 210, it can take a long time, such as many months and up to two years, for the production chamber to reach overburden 210, when the pay zone is relative thick as is typically found in some operating oil sands reservoirs. However, it will be appreciated that in a thinner pay zone, the production chamber can reach the overburden sooner. The time to reach the vertical expansion limit can also be longer in cases where the pay zone is higher or highly heterogeneous, or the formation has complex overburden geologies such as with inclined heterolithic stratification (HIS), top water, top gas, or the like.

In some embodiments of the present disclosure, at early stages of oil production, steam may be injected without a solvent. The solvent may be added as a mobilizing agent after the production chamber has reached or is near the top of the pay zone, e.g., near or at the lower edge of the overburden 210 or after the oil production rate has peaked. The solvent can dissolve in oil and dilute the oil stream so as to increase the mobility and flow rate of hydrocarbons or the diluted oil stream towards production well 230 for improved oil recovery. Other materials in liquid or gas form may also be added to the injection fluid to enhance recovery performance.

The start-up, ramp-up, and production phases may be conducted according to any suitable conventional techniques known to those skilled in the art except the aspects described herein, and the other aspects will therefore not be detailed herein for brevity. As an example, during production, such as at the end of an initial production period with steam injection, the formation temperature in the production chamber can reach about 235° C. and the pressure in the production chamber may be about 3 MPa. The temperature or pressure may vary by about 10% to about 20%.

As mentioned earlier, in a particular embodiment where propane is used as the solvent, the injection temperature of the steam-propane mixture may be about 80° C. to about 250° C. In other embodiments, the injection temperature may be selected based on the boiling point temperature of the solvent at the selected injection pressure. Of course, depending on the reservoir and the application, the chamber temperature and pressure may also vary in different embodiments. For example, in various embodiments, steam may be injected at a temperature from about 150° C. to about 330° C. and a pressure from about 0.1 MPa to about 12.5 MPa. In some embodiments, the highest temperature in the production chamber may be from about 50° C. to about 350° C. and the pressure in the production chamber may be from about 0.1 MPa to about 7 MPa.

In further embodiments, it may also be possible that steam is injected at a temperature sufficient to heat the solvent such that the injected solvent has a maximum temperature of between about 50° C. and about 350° C. within the production chamber.

A suitable solvent may be selected based on a number of considerations and factors as discussed herein. The solvent should be injectable as a vapour, and can dissolve at least one of the heavy hydrocarbons to be recovered from reservoir 200 in the solvent-steam process for increasing mobility of the heavy hydrocarbons. The solvent may be a viscosity-reducing solvent, which reduces the viscosity of the heavy hydrocarbons in reservoir 200.

It is noted that steam injection with solvent injection can conveniently facilitate transportation of the solvent as a vapour with steam to the steam front. Steam is typically a more efficient heat-transfer medium than a solvent, and can increase the reservoir temperature more efficiently and more economically, or maintain the production chamber at a higher temperature. The heat, or higher formation temperature in a large region in the formation, can help to maintain the solvent in the vapour phase and assist dispersion of the solvent to the chamber edges ("steam front"). The heat from steam can also by itself assist reduction of viscosity of the hydrocarbons. However, injecting steam requires more heating energy and inject steam at a too high ratio can reduce the energy efficiency of the process.

The solvent is injected into reservoir 200 in a vapour phase. Injection of the solvent in a vapour phase allows the solvent vapour to travel in the production chamber and condense at a region away from injection well 220. Allowing solvent to travel in production chamber before condensing may achieve beneficial effects. For example, oil production performance, such as indicated by one or more of oil production rate, cumulative steam to oil ratio (cSOR), and overall efficiency, may be improved. Injection of solvent in the gaseous phase, rather than a liquid phase, may allow vapour to rise in production chamber before condensing so that condensation occurs away from injection well 220. It is noted that injecting solvent vapour into the production chamber does not necessarily require solvent be fed into the injection well in vapour form. The solvent may be heated downhole and vaporized in the injection well 220 in some embodiments. Alternatively, the solvent may be injected into another well or other wells for more efficient delivery of the solvent to desired locations in the reservoir. The additional well(s) may include a vertical well, a horizontal well, or a well drilled according to the well drilled using Wedge Well™ technology.

The total injection pressure for solvent and steam co-injection may be the same or different than the injection pressure during a conventional SDP production process. For example, the injection pressure may be maintained at between about 2 MPa and about 3.5 MPa, or up to about 4 MPa. In another example, steam may be injected at a pressure of about 3 MPa initially, while steam and solvent are co-injected at a pressure of about 2 MPa to about 3.5 MPa during co-injection.

The solvent may be heated before or during injection to vaporize the solvent. Additionally or alternatively, solvent may be mixed or co-injected with steam to heat the solvent to vaporize it and to maintain the solvent in vapour phase. Depending on whether the solvent is pre-heated at surface, the weight ratio of steam in the injection stream should be high enough to provide sufficient heat to the co-injected solvent to maintain the injected solvent in the vapour phase. If the feed solvent from surface is in the liquid phase, more steam may be required to both vaporize the solvent and maintain the solvent in the vapour phase as the solvent travels through the production chamber.

In different embodiments, co-injection of steam and the solvent may be carried out in a number of different ways or manners as can be understood by those skilled in the art. For example, co-injection of the solvent and steam into the production chamber may include gradually increasing the weight ratio of the solvent in the co-injected solvent and steam, and gradually decreasing the weight ratio of steam in the co-injected solvent and steam. At a later stage, the solvent content in the co-injected solvent and steam may be gradually decreased, and the steam content in the co-injected solvent and steam may be gradually increased. For example, depending on market factors, the cost of solvent may change over the life of a steam-solvent process. During or after the solvent-steam process, it may be of economic benefit to gradually decrease the solvent content and gradually increase the steam content. Solvent injection is expected to result in increased mobility of at least some of the heavy hydrocarbons of reservoir formation 200. For example, some solvents such as propane and butane are expected to dissolve in and dilute heavy oil thus increasing the mobility of the oil. The effectiveness and efficiency of the solvent depends on the solubility and diffusion of the solvent in hydrocarbons. Slow diffusion or low solubility of the solvent in the hydrocarbons can limit the effect of the solvent on oil drainage rate. Therefore, the operation conditions may be modified to increase solvent diffusion and solubility to optimize process performance and efficiency. The term "mobility" is used herein in a broad sense to refer to the ability of a substance to move about, and is not limited to the flow rate or permeability of the substance in the reservoir. For example, the mobility of heavy hydrocarbons may be increased when they become more mobile, or when heavy hydrocarbons attached to sands become easier to detach from the sands, or when immobile heavy hydrocarbons become mobile, even if the viscosity or flow rate of the hydrocarbons has not changed. The mobility of heavy hydrocarbons may also be increased by decreasing the viscosity of the heavy hydrocarbons, or when the effective permeability, such as through bituminous sands, is increased. Additionally or alternatively, increasing heavy hydrocarbon mobility may be achieved by heat transfer from solvent to heavy hydrocarbons.

Additionally or alternatively, solvent may otherwise accelerate production. For example, a non-condensable gas, such as methane, may propel a solvent, such as propane, downwards thereby enhancing lateral growth of the production chamber. For example, such propulsion may be part of a blowdown phase.

Conveniently, a solvent-steam process where solvent is co-injected with steam requires less steam as compared to the SAGD production phase. Injection of less steam may reduce water and water treatment costs required for production. Injection of less steam may also reduce the need or costs for steam generation for an oil production project. Steam may be produced at a steam generation plant using boilers. Boilers may heat water into steam via combustion of hydrocarbons such as natural gas. A reduction in steam generation requirement may also reduce combustion of hydrocarbons, with reduced emission of greenhouse gases such as, for example, carbon dioxide.

Once the oil production process is completed, the operation may enter an ending or winding down phase, with a process known as the "blowdown" process. The "blowdown" phase or stage may be performed in a similar manner as in a conventional SAGD process. During the blowdown stage, a non-condensable gas may be injected into the reservoir to replace steam or the solvent. For example, the non-condensable gas may be methane. In addition, methane may enhance hydrocarbon production, for example by about 10% within 1 year, by pushing the already injected solvent through the chamber.

Alternatively, in an embodiment a solvent may be continuously utilized through a blowdown phase, in which case it is possible to eliminate or reduce injection of methane during blowdown. In particular, it is not necessary to implement a conventional blowdown phase with injected methane gas, when a significant portion of the injected solvent can be readily recycled and reused. In some embodiments, during or at the end of the blowdown phase, methane or another non-condensable gas (NCG) may be used to enhance solvent recovery, where the injected methane or other non-condensable gas may increase solvent condensation and thus improve solvent recovery. For example, injected methane or other NCG may mobilize gaseous solvent in the chamber to facilitate removal of the solvent.

During the blowdown phase, oil recovery or production may continue with production operations being maintained. When methane is used for blowdown, oil production performance will decline over time as the growth of the vapour front in production chamber slows under methane gas injection.

At the end of the production operation, the injection wells may be shut in but solvent (and some oil) recovery may be continued, followed by methane injection to enhance solvent recovery. The formation fluid may be produced until further recovery of fluids from the reservoir is no longer economical, e.g. when the recovered oil no longer justifies the cost for continued production, including the cost for solvent recycling and re-injection. In some embodiments, before, during or after the blowdown phase, production of fluids from the reservoir through production well 230 may continue. An embodiment of the production control process disclosed herein may be used, or adapted to use, during the blowdown phase to control the produced gas phase such as methane when steam and methane are produced during the blowdown phase. The solvent for injection may be selected based on a number of criteria. As discussed above, the solvent should be injectable as a vapour, and can dissolve at least one of the heavy hydrocarbons to be recovered from reservoir 200 in the solvent-steam process for increasing mobility of the heavy hydrocarbons. Conveniently, increased hydrocarbon mobility can enhance drainage of the reservoir fluid toward and into production well 230. In a given application, the solvent may be selected based on its volatility and solubility in the reservoir fluid. For example, in the case of a reservoir with a thinner pay zone (e.g., the pay zone thickness is less than about 8 m), or a reservoir having a top gas zone or water zone, the solvent may be injected in a liquid phase in the solvent-steam process.

Suitable solvents may include C3 to C5 hydrocarbons such as, propane, butane, pentane, or a combination thereof such as in a diluent composition. Additionally or alternatively, a C6 hydrocarbon such as hexane could be employed. A combination of solvents including C3-C6 hydrocarbons and one or more heavier hydrocarbons may also be suitable in some embodiments. Suitable solvents may include a condensate. Condensates often comprise hydrocarbons in the range of C3 to C12 or higher. The condensates may primarily comprise light end compounds—those hydrocarbons of such a mixture having the lowest number of carbon atoms, typically C1 to C7, but possibly higher in some cases. Such light end compounds have the lowest molecular weights, and are generally the more volatile of the hydrocarbon compounds of the mixture. Solvents that are more volatile, such as those that are gaseous at standard temperature and pressure (STP), or significantly more volatile than steam at reservoir conditions, such as propane or butane, may be beneficial in some embodiments.

For selecting a suitable solvent, the properties and characteristics of various candidate solvents may be considered and compared. For a given selected solvent, the corresponding operating parameters during co-injection of the solvent with steam should also be selected or determined in view the properties and characteristics of the selected solvent.

In particular, the injection temperature should be sufficiently high and the injection pressure should be sufficiently low to ensure most of the solvent will be injected in the vapour phase into the production chamber. In this context, injection temperature and injection pressure refer to the temperature and pressure of the injected fluid in the injection well, respectively. The temperature and pressure of the injected fluid in the injection well may be controlled by adjusting the temperature and pressure of the fluid to be injected before it enters the injection well. The injection temperature, injection pressure, or both, may be selected to ensure that the solvent is in the gas phase upon injection from the injection well into the production chamber. Solvents may be selected having regard to reservoir characteristics such as, the size and nature of the pay zone in the reservoir, properties of fluids involved in the process, and characteristics of the formation within and around the reservoir. For example, a relatively light hydrocarbon solvent such as propane may be suitable for a reservoir with a relatively thick pay zone, as a lighter hydrocarbon solvent in the vapour phase is typically more mobile within the heated production chamber.

Additionally or alternatively, solvent selection may include consideration of the economics of heating a selected particular solvent to a desired injection temperature. For example, as can be appreciated by those skilled in the art, lighter solvents, such as propane and butane, can be efficiently injected in the vapour phase at relatively low temperatures at a given injection pressure. In comparison, efficient pure steam injection in a SAGD process typically requires a much higher injection temperature, such as about 200° C. or higher.

Heavier solvents typically also require a higher injection temperature. For example, pentane may need to be heated to about 190° C. for injection in the vapour phase at injection pressures up to about 3 MPa. In comparison, a light solvent such as propane may be injected at temperatures as low as about 50° C. to about 70° C. depending on the reservoir pressure.

Different solvents or solvent mixtures may be suitable candidates. For example, the solvent may be propane, butane, or pentane. A mixture of propane and butane may also be used in an appropriate application. It is also possible that a selected solvent mixture may include heavier hydrocarbons in proportions that are, for example, low enough that the mixture still satisfies the above described criteria for selecting solvents.

In some embodiments, the vapour pressure profile of the solvent may be selected such that the partial pressure of the solvent in a central (core) region of the production chamber is within about 0.25% to about 20% of the total gas pressure, or the vapour pressure of water/steam.

It may be desirable if the solvent and steam can vaporize and condense under similar temperature and pressure conditions, which will conveniently allow vapour of the solvent to initially rise up with the injected steam to penetrate the rock formation in the production chamber, and then condense with the steam to form a part of the mobilized reservoir fluid. For example, in some embodiments, the solvent may have a boiling point that resembles the boiling point of water under the steam injection conditions such that it is sufficiently volatile to rise up with the injected steam in vapour form when penetrating the steam chamber and then condense at the edge of the steam chamber. The boiling temperature of the solvent may be near the boiling temperature of water at the same pressure.

Conveniently, when the solvent has vaporization characteristics that resemble, closely match, those of water under the reservoir conditions, the solvent can condense when it reaches the steam front or the edge of the steam chamber, which is typically at a lower temperature such as at about 12° C. to about 150° C. The condensed solvent may be soluble in or miscible with either the hydrocarbons in the reservoir fluid or the condensed water, so as to increase the drainage rate of the hydrocarbons in the fluid through the reservoir formation.

The condensed solvent is soluble in oil, and thus can dilute the oil stream, thereby increasing the mobility of oil in the fluid mixture during drainage. In some embodiments, the condensed solvent is also soluble in or miscible with the condensed water, which may lead to increased water flow rate by promoting formation of oil-in-water emulsions. Without being limited to any particular theory, the dispersion of the solvent and the steam may facilitate the formation of an oil-in-water emulsion under suitable reservoir conditions and also increase the fraction of oil carried by the fluid mixture. As a result, more oil may be produced for the same amount of, or less, steam, which is desirable.

A possible mechanism for improving mobility of oil is that the solvent can act as a diluent due to its solubility in oil and optionally water, thus reducing the viscosity of the resulting fluid mixture. The solvent may interact at the oil surface to reduce capillary and viscosity forces.

A vapour mixture of steam and the solvent may be delivered into production chamber using any suitable delivery mechanism or route. For example, injection well 220 may be conveniently used to deliver the vapour mixture. A mobilizing fluid or agent may be injected in the form of a mixture of steam and solvent (e.g., mixed ex-situ), or separate streams may be injected into the injection well 220 for mixing in the injection well 220.

EXAMPLES

Example 1

State-of-the-art simulation protocols were used to compare an archetypal method of the present disclosure to two conventional processes using a well characterized field well to set reservoir parameters. Relevant parameters for the comparison are set out in Table 2.

TABLE 2

Simulation parameters used for comparison of a method in accordance with the present disclosure against conventional processes.

| Technology | Reservoir Property | Value |
| --- | --- | --- |
| All | Porosity | 0.34 |
| All | Horizontal Permeability | 6435 mD |
| All | Vertical Permeability | 3217 mD |
| All | Pay Thickness | 8 m |
| All | Well Spacing | 60 m |
| All | Injection Pressure | 3,000 kPa |
| SAP/SDP/HTSO | Solvent Type | Propane |
| SAP | Solvent Concentration | 10 wt. % |
| SDP | Solvent Concentration | 60 wt. %. |
| HTSO | Injection Temperature | 300° C. |
| SAGD/SAP/SDP | Recovery Factor before Blowdown | 60% |
| HTSO | Recovery Factor before Blowdown | 50% |

The present example employs a well-pad configuration similar to the one shown schematically in FIG. 1, wherein, for the method in accordance with the present disclosure:
  i) well pairs 102 and 116 are configured for SAGD (injection fluid=0 wt. % solvent and 100 wt. % steam);
  ii) well pairs 104 and 114 are configured for SAP (injection fluid=10 wt. % solvent and 90 wt. % steam);
  iii) well pairs 106 and 112 are configured for SDP (injection fluid=60 wt. % solvent and 40 wt. % steam); and
  iv) well pairs 108 and 110 are configured for HTSO (injection fluid=100 wt. % solvent and 0 wt. % steam).

In the present example, the two conventional methods used for comparative purposes are "SAGD" and "steam/solvent-averaged", respectively. In the SAGD method, well pairs 102, 104, 106, 108, 110, 112, 114, and 116 are each configured for SAGD (injection fluid composition=0 wt. % solvent and 100 wt. % steam). In the steam/solvent-averaged method, well pairs 102, 104, 106, 108, 110, 112, 114, and 116 are each configured for to inject an injection-fluid comprising 42.5 wt. % solvent and 57.5 wt. % steam, which equates to the weighted-average solvent concentration employed across the well pad in the method of the present disclosure.

FIG. 3A and FIG. 3B show profile-view half-symmetry reservoir models of temperature distribution and solvent distribution after three years of operating a method in accordance with the present disclosure. FIG. 3A and FIG. 3B include lead lines and reference numbers to indicate the position of well pairs 102, 104, 106, and 108 (reference numbers 110, 112, 114, and 116 are not shown in the half-symmetry reservoir model). For ease of reference, the relevant technology types are included beside the reference numerals.

FIG. 3A shows that, for the method in accordance with the present disclosure, the temperature gradients are delocalizing towards adjacent well pairs. For example, the temperature gradient from SAP well pair 104 is progressively spreading, such that hydrocarbons in proximity to SDP well 106 are progressively warmed. The overall trend of temperature-gradient delocalization between wells 102, 104, 106, and 108 is generally indicated in FIG. 3A with a dashed arrow. Note, even though the injection temperature of the HTSO process is relatively high (300° C.), the temperature gradient it induces has relatively little delocalization potential, because of the relatively low specific heat capacity of the solvent.

FIG. 3B shows that, for the method in accordance with the present disclosure, the solvent-concentration gradients are delocalizing towards adjacent well pairs. For example, the solvent-concentration gradients of well pairs 104 and 106 are sufficiently delocalized to create a continuous solvent gradient between the well pairs. The overall trend of solvent-gradient delocalization between wells 102, 104, 106, and 108 is generally indicated in FIG. 3B with a dashed arrow.

Figure 4:
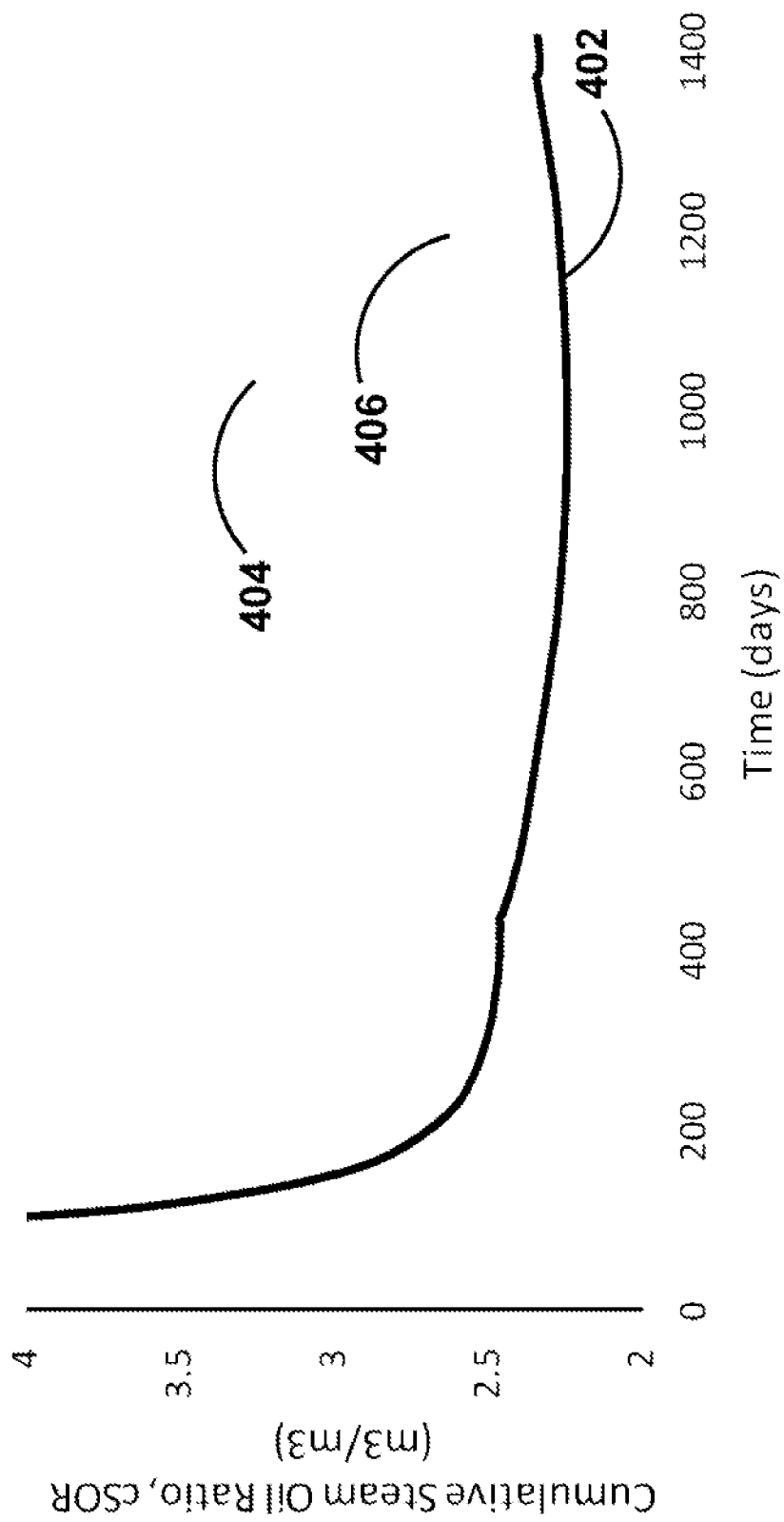
FIG. 4 shows a plot of cumulative steam-oil ratio (cSOR) as a function of time for a method in accordance with the present disclosure along with comparative SAGD and steam/solvent-averaged plots.

FIG. 4 shows a plot of cumulative steam-oil ratio (cSOR) as a function of time for the method in accordance with the present disclosure along with the comparative SAGD and steam/solvent-averaged plots. In FIG. 4, the plot associated with the method in accordance with the present disclosure is indicated by reference number 402, while the plots associated with the SAGD and steam/solvent-averaged processes are indicated by reference numbers 404 and 406, respectively. Comparing plots 402, 404, and 406 highlights that the method of the present disclosure provides improved cSOR as compared to both the SAGD and steam/solvent-averaged processes.

Figure 5:
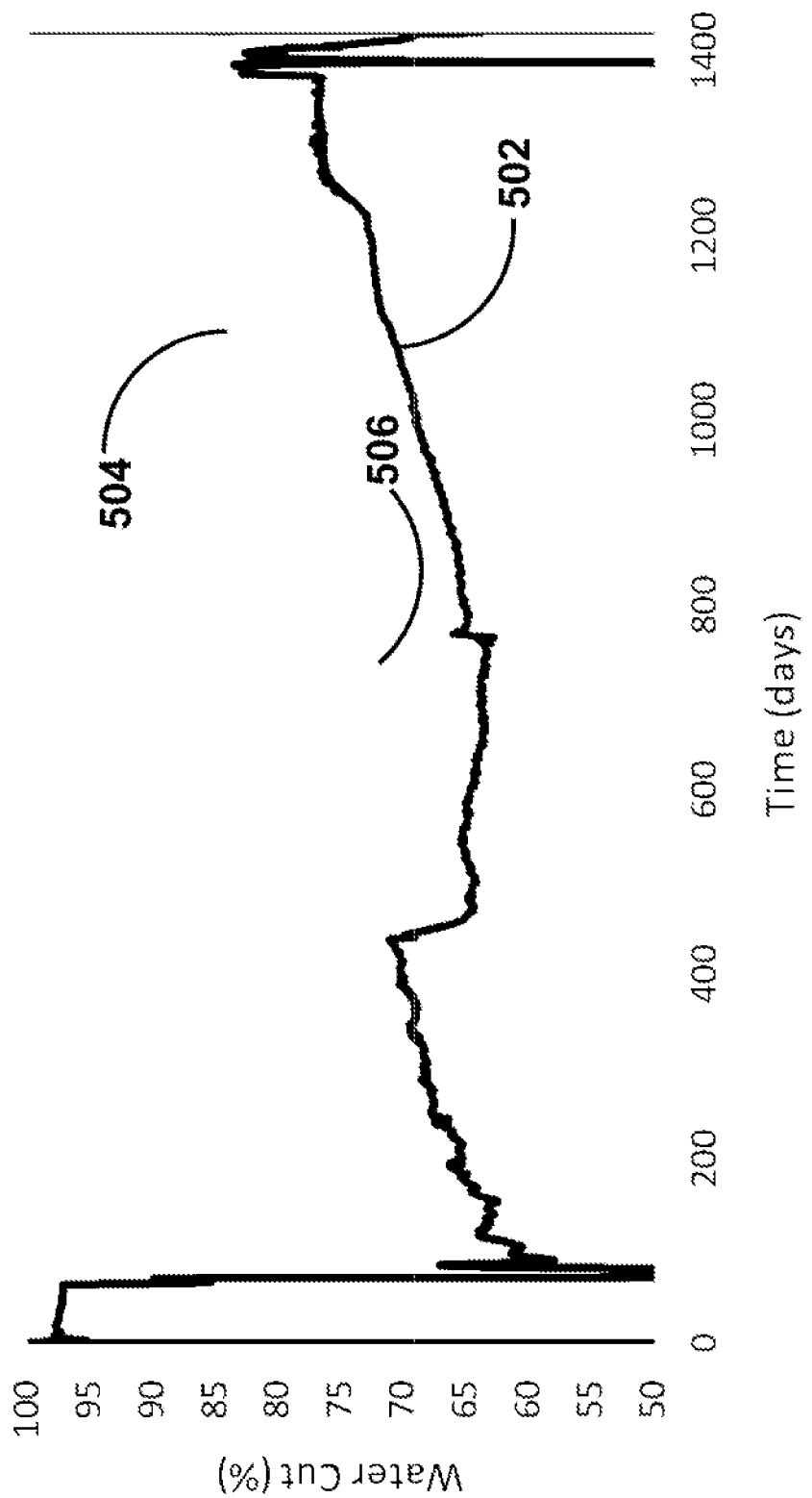
FIG. 5 shows a plot of water cut as a function of time for a method in accordance with the present disclosure along with comparative SAGD and steam/solvent-averaged plots.

FIG. 5 shows a plot of water cut as a function of time for a method in accordance with the present disclosure along with comparative SAGD and steam/solvent-averaged plots. In FIG. 5, the plot associated with the method in accordance with the present disclosure is indicated by reference number 502, while the plots associated with the SAGD and steam/solvent-averaged processes are indicated by reference numbers 504 and 506, respectively. Comparing plots 502, 504, and 506 highlights that the method of the present disclosure provides improved water cut percentages as compared to both the SAGD and steam/solvent-averaged processes.

Figure 6:
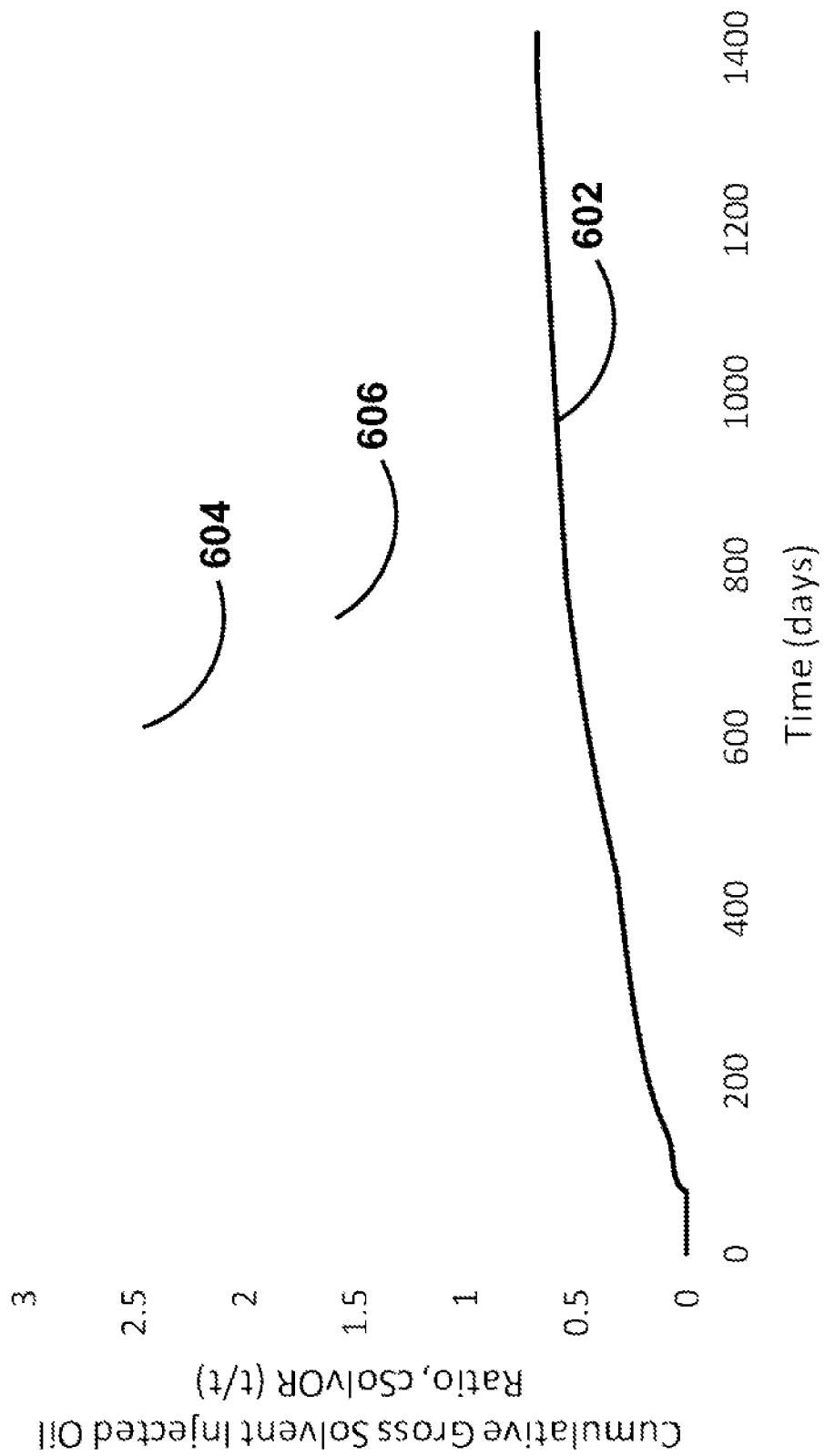
FIG. 6 shows a plot of cumulative solvent-oil ratio ($cS_{olv}OR$) as a function of time for a method in accordance with the present disclosure along with comparative SO and steam/solvent-averaged plots.

FIG. 6 shows a plot of cumulative solvent-oil ratio ($cS_{olv}OR$) as a function of time for a method in accordance with the present disclosure along with comparative HTSO and steam/solvent-averaged plots. In FIG. 6, the plot associated with the method in accordance with the present disclosure is indicated by reference number 602, while the plots associated with the HTSO and steam/solvent-averaged processes are indicated by reference numbers 604 and 606, respectively. Comparing plots 602, 604, and 606 highlights that the method of the present disclosure provides improved $cS_{olv}OR$ as compared to both the HTSO and steam/solvent-averaged processes.

The subsurface advantages exemplified in FIGS. 4 to 6 are likely to yield additional advantages at the surface-facilities level. For example, a surface treating facility designed to handle 60% water cut can be significantly less expensive than one required to handle 80% water cut. This is due to the cost of separator efficiency being non-linear with diminishing returns to scale.

Figure 7:
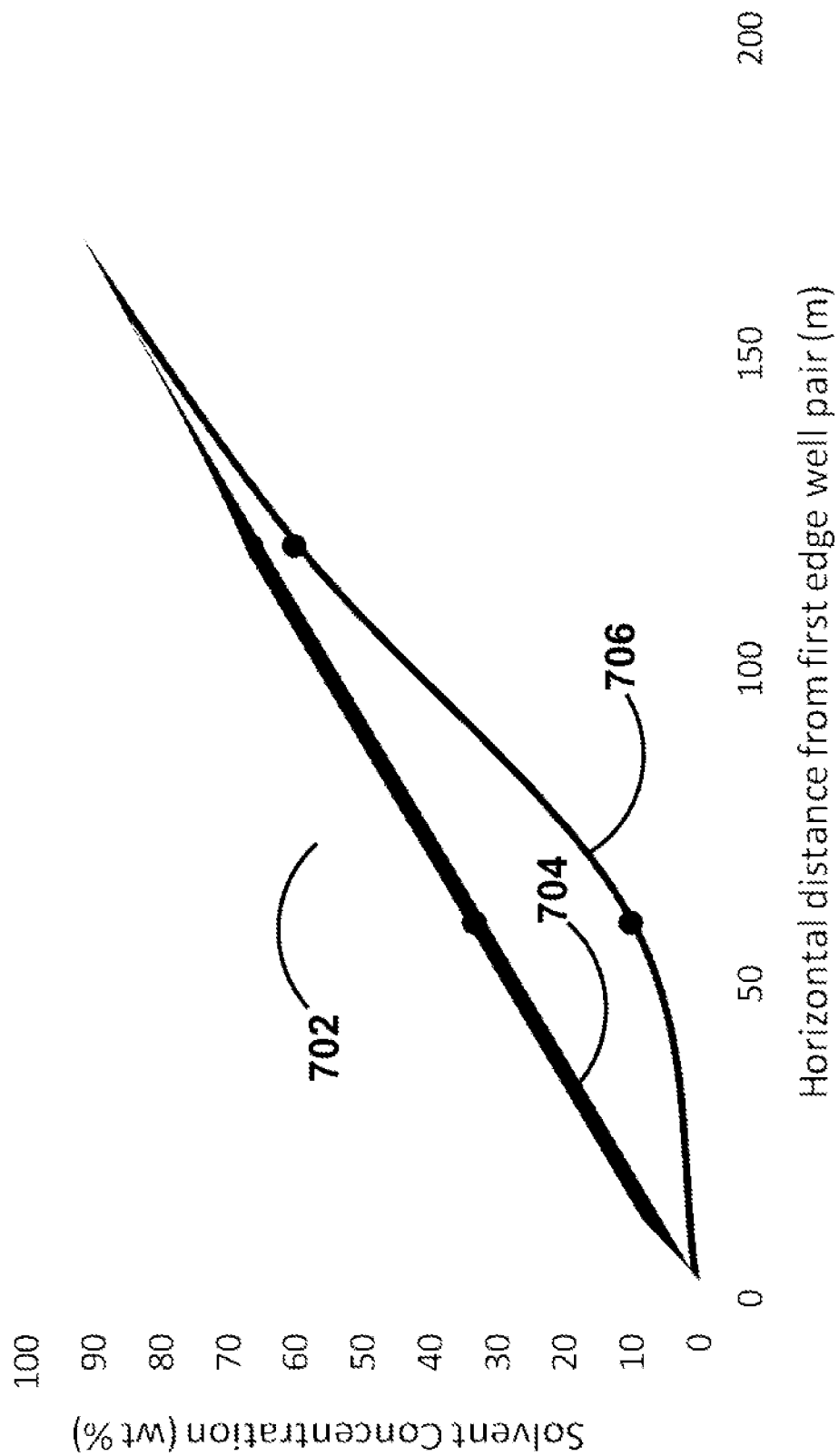
FIG. 7 shows a plot of solvent concentration as a function of horizontal distance from first edge well pair for a series of methods in accordance with the present disclosure.

FIG. 7 shows a plot of solvent concentration as a function of horizontal distance from a first edge well pair for a series of methods in accordance with the present disclosure. With reference to FIG. 1, the horizontal distance from the first edge well pair can be considered the distance from well pair 102 to well pairs 104, 106, and 108, respectively. For example, in an embodiment where the inter-well-pair spacing is about 60 m, the horizontal distance from well pair 102 to well pair 104 is 60 m, the horizontal distance between well pair 102 and well pair 106 is 120 m and the horizontal distance between well pair 102 and well pair 108 is 180 m.

TABLE 3

Example concentrations that maximizes different concentration gradients in the methods of the present disclosure.

| Distance from edge of first edge well pair | 706 | 704 | 702 |
|---|---|---|---|
| 0 | 0 | 0 | 0 |
| 60 | 10 | 33.3333 | 50 |
| 120 | 60 | 66.6667 | 70 |
| 180 | 100 | 100 | 100 |

In FIG. 7, plot 704 correlates with a method where injecting varying concentrations of steam, solvent, or combinations thereof comprises injecting increasing concentrations of solvent in a substantially linear fashion across at least a portion of the array. In FIG. 7, plots 702 and 706 correlate with methods where injecting varying concentrations of steam, solvent, or combinations thereof comprises injecting increasing concentrations of solvent in a non-linear fashion across at least a portion of the array. In particular, plot 702 correlates with a method where a steep solvent-concentration gradient is established between well pairs 102 and 104, and plot 706 correlates with a method where a steep solvent-concentration gradient is established between well pairs 104 and 106.

Example 2

State-of-the-art simulation protocols were used to compare pressure effects across a series of methods in accordance with the present disclosure. The simulations modeled a SAGD/SAP/SAGD well configuration using the parameters set out in Table 4.

TABLE 4

Simulation parameters used to model a series of methods in accordance with the present disclosure having different inter-well pressure differentials.

| Technology | Reservoir Property | Value |
|---|---|---|
| All | Porosity | 0.34 |
| All | Horizontal Permeability | 6435 mD |
| All | Vertical Permeability | 3217 mD |
| All | Pay Thickness | 8 m |
| All | Well Spacing | 60 m |
| SAP | Solvent Type | Propane |
| SAP | Solvent Concentration | 10 wt. % |

Figure 8:
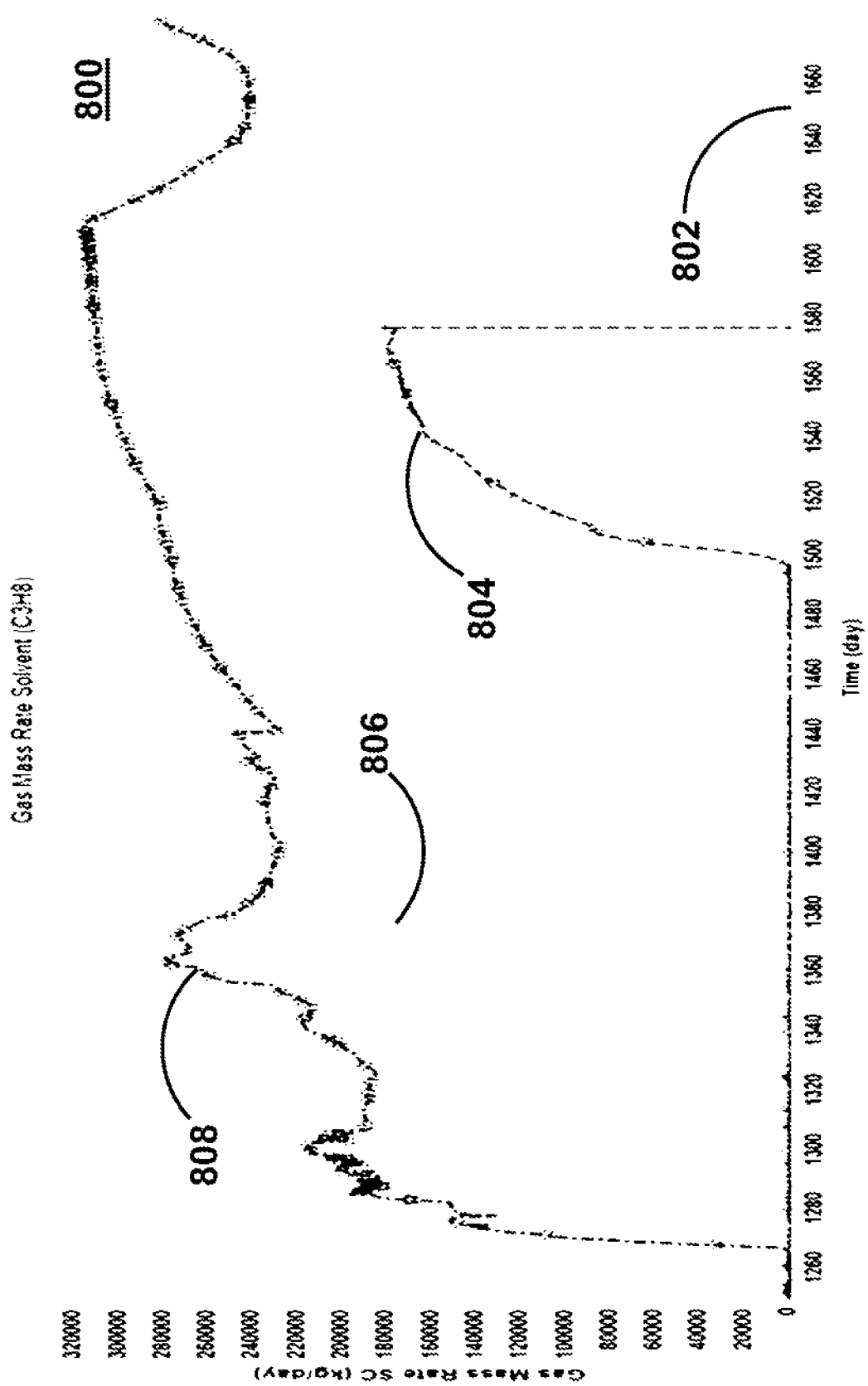
FIG. 8 shows a plot of gaseous solvent production as a function of time for a series of methods in accordance with the present disclosure.

In the present example, the peripheral SAGD well pairs were modeled as if operated at an injection pressure of 3,000 kPa, and the injection pressure for the medial SAP well pair was modelled as if operated at: (i) 3,000 kPa; (ii) 3,100 kPa; (iii) 3,200 kPa; and (iv) 3,300 kPa, across a four-simulation trial. Accordingly, the four-simulation trial represents inter-well pressure differentials of 0 kPa, 100 kPa, 200 kPa, and 300 kPa. FIG. 8 provides a plot 800 of the rates of gaseous solvent recovery from the peripheral SAGD well pairs as a function of time for the four-simulation trial (on mass basis). In FIG. 8, the gas production rate function for the trail representing a 0 kPa inter-well pressure differential is indicated by reference number 802, and the function remains at zero across the evaluation period (i.e. about 1,250 days to about 1,680 days) indicating an absence of solvent production via the peripheral SAGD well pairs when the inter-well pressure differential was 0 kPa. In FIG. 8, the gas-production-rate function for the trials representing inter-well pressure differentials of 100 kPa, 200 kPa, and 300 kPa are indicated by reference numbers 804, 806, and 808, respectively. The relative onset points for gas-production rate functions 804, 806, and 808 indicate that the rate of solvent migration varies based on the inter-well injection pressure, and that relatively modest pressure differentials (such as 100 kPa) are sufficient to drive solvent migration. The trials representing 100 kPa, 200 kPa, and 300 kPa inter-well pressure differentials correlate with solvent production onset from the peripheral SAGD wells at about 1,486 days, 1,364 days, and 1,267 days, respectively.

In the present disclosure, all terms referred to in singular form are meant to encompass plural forms of the same. Likewise, all terms referred to in plural form are meant to encompass singular forms of the same. Unless defined otherwise, all technical and scientific terms used herein have the same meaning as commonly understood by one of ordinary skill in the art to which this disclosure pertains.

As used herein, the term "about" refers to an approximately +/−10% variation from a given value. It is to be understood that such a variation is always included in any given value provided herein, whether or not it is specifically referred to.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Although individual embodiments are discussed, the disclosure covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

Many obvious variations of the embodiments set out herein will suggest themselves to those skilled in the art in light of the present disclosure. Such obvious variations are within the full intended scope of the appended claims.

The invention claimed is:

1. A method for producing hydrocarbons from a subterranean reservoir, the method comprising:
   penetrating the subterranean reservoir with a plurality of well pairs laterally displaced across a well pad in an array, the plurality of well pairs comprising at least one steam-dominant well pair and at least one solvent-dominant well pair;
   operating the at least one steam-dominant well pair and the at least one solvent-dominant well pair under a first set of conditions that induce a localized solvent-concentration gradient in proximity to the at least one solvent-dominant well pair and a localized temperature gradient in proximity to the at least one steam-dominant well pair, within the subterranean reservoir by injecting a steam-dominant injectant through the at least one steam-dominant well pair and a solvent-dominant injectant through the at least one solvent-dominant well pair;
   determining at least one additional well pair of the plurality of well pairs that is heat-depleted and/or solvent-lean; and
   subsequently operating the at least one steam-dominant well pair when the at least one additional well pair is heat-depleted and/or the at least one solvent-dominant well pair when the at least one additional well pair is solvent-lean under a second set of conditions that delocalizes the solvent-concentration gradient from the at least one solvent-dominant well pair and/or the temperature gradient from the at least one steam-dominant well pair, as the case may be, toward the at least one additional well pair by modifying inter-well pressure differentials between the at least one additional well pair and the at least one steam-dominant well pair and/or the at least one solvent-dominant well pair to enhance hydrocarbon production at the at least one additional well pair.

2. The method of claim 1, wherein the array is a three-well-pair array, a four-well-pair array, a five-well-pair array, a six-well-pair array, a seven-well-pair array, an eight-well-pair array, a nine-well-pair array, a ten-well-pair array, an eleven-well-pair array, a twelve-well-pair array, a thirteen-well-pair array, a fourteen-well-pair array, a fifteen-well-pair array, a sixteen-well-pair array, a seventeen-well-pair array, an eighteen-well-pair array, a nineteen-well-pair array, or a twenty-well-pair array.

3. The method of claim 1, wherein the array is bilaterally symmetrical.

4. The method of claim 1, wherein the array comprises: (i) a steam-assisted gravity drainage process (SAGD)/solvent-aided process (SAP)/solvent-driven process (SDP)/solvent only process (SO) well-pair configuration wherein the at least one steam-dominant well pair comprises at least one SAGD well pair and at least one SAP well pair and the at least one solvent-dominant well pair comprises at least one SDP well pair and at least one SO well pair, or (ii) a SAGD/SAP/SDP well-pair configuration wherein the at least one steam-dominant well pair comprises at least one SAGD well pair and at least one SAP well pair and the at least one solvent-dominant well pair comprises at least one SDP well pair, or (iii) a SAP/SDP/SO well-pair configuration wherein the at least one steam-dominant well pair comprises at least one SAP well pair and the at least one solvent-dominant well pair comprises at least one SDP well pair and at least one SO well pair, or (iv) a SAGD/SDP/SO well-pair configuration wherein the at least one steam-dominant well pair comprises at least one SAGD well pair and the at least one solvent-dominant well pair comprises at least one SDP well pair and at least one SO well pair, or (v) a SAGD/SAP/SO well-pair configuration wherein the at least one steam-dominant well pair comprises at least one SAGD well pair and at least one SAP well pair and the at least one solvent-dominant well pair comprises at least one SO well pair.

5. The method of claim 1, wherein the well pad further comprises a second plurality of well pairs that are not part of the array.

6. The method of claim 1, wherein the second set of conditions:
   delocalizes the solvent-concentration gradient and/or the temperature gradient across: (i) about 20% of the array, (ii) about 30% of the array, (iii) about 40% of the array, (iv) about 50% of the array, (v) about 60% of the array, (vi) about 70% of the array, (vii) about 80% of the array, (viii) about 90% of the array, or (ix) about 100% of the array; and/or, provide bottom-hole pressure (BHP) values that differ between about 0 kPa and about 500 kPa as defined between adjacent well pairs within the array; and/or,
   provide BHP values that are the same between adjacent well pairs within the array.

7. The method of claim 6, wherein the second set of conditions provides BHP values that are the same along the well pairs.

8. The method of claim 6, wherein the second set of conditions provides BHP values that are different along the well pairs.

9. The method of claim 1, wherein the second set of conditions delocalizes the solvent-concentration gradient and/or the temperature gradient over a period of between about 1 month and about 36 months.

10. The method of claim 1, wherein the plurality of well pairs within the array have an average well spacing of between about 20 meters and about 200 meters.

11. The method of claim 1, wherein the plurality of well pairs are laterally displaced across the well pad such that the array comprises equal well spacing, or variable well spacing.

12. The method of claim 1, wherein the first set of conditions are transitioned to the second set of conditions in response to a time-based trigger, a production-based trigger, an economic trigger, or a combination thereof.

13. The method of claim 1, wherein the solvent-dominant injectant comprises propane, butane, diluent, natural gas condensate, or a combination thereof.

14. The method of claim 1, wherein the subterranean reservoir comprises:
- a thin pay zone less than about 8 m in thickness, and wherein the temperature gradient is delocalized into the thin pay zone; and/or,
- a heterogeneous pay zone, and wherein the temperature gradient is delocalized into the heterogeneous pay zone; and/or,
- a thin pay zone less than about 8 m in thickness, and wherein the solvent-concentration gradient is delocalized into the thin pay zone; and/or,
- a heterogeneous pay zone, and wherein the solvent-concentration gradient is delocalized into the heterogeneous pay zone.

* * * * *